United States Patent Office 3,023,879
Patented Mar. 6, 1962

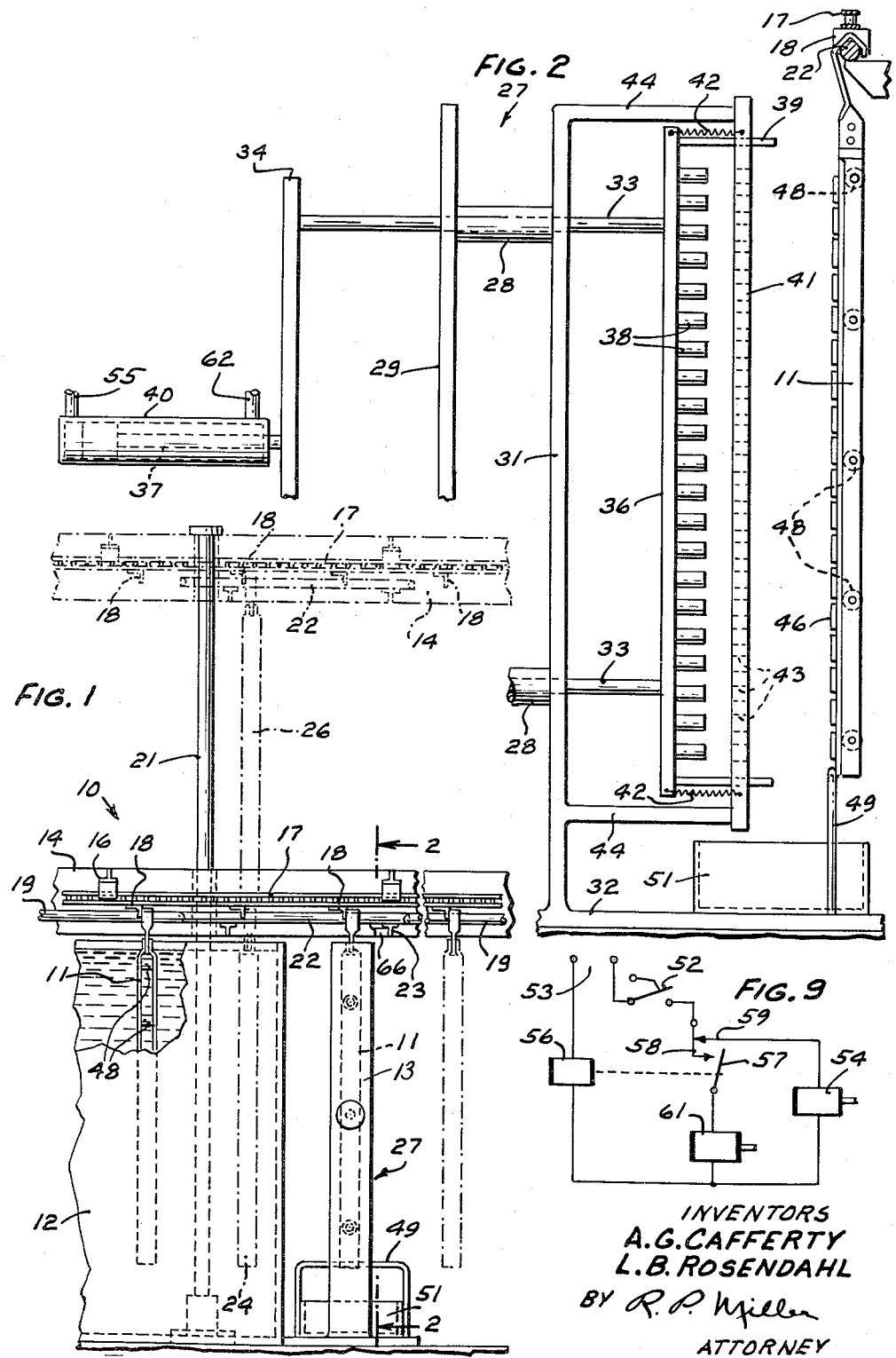

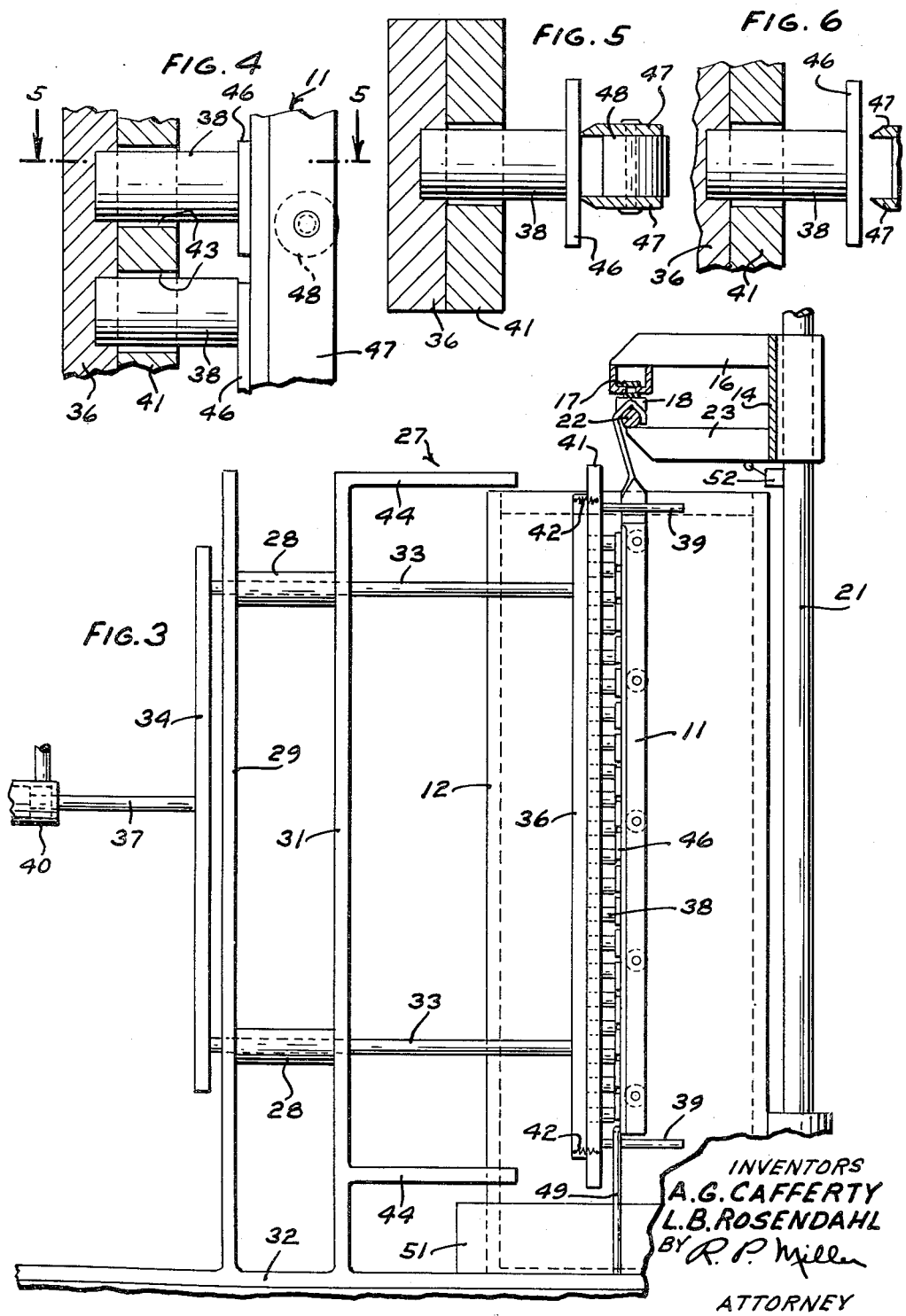

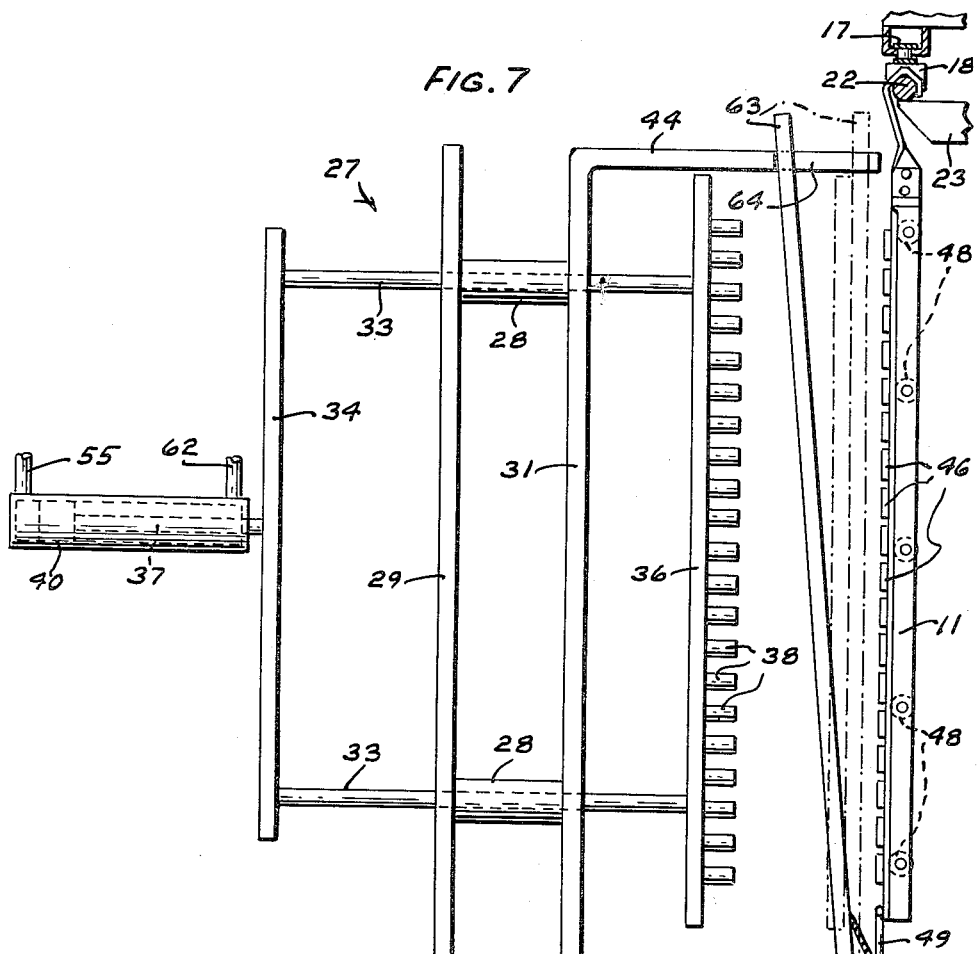

3,023,879
MAGNETIC ARTICLE HANDLING APPARATUS
Aloysius G. Cafferty, Venice, Calif., and Lawrence B. Rosendahl, La Grange Park, Ill., assignors to Western Electric Company, Incorporated, New York, N.Y., a corporation of New York
Filed Apr. 10, 1959, Ser. No. 805,608
9 Claims. (Cl. 198—41)

This invention relates to a magnetic article handling apparatus and more particularly, to a combination of a magnetic article carrier for moving articles along a predetermined path and a device for magnetically removing the articles from the carrier.

In a magnetic handling systems, where articles are held by magnetic carriers or racks and the carriers are transported through a plurality of article fabricating stations, it has been found advantageous to use carriers magnetized with permanent magnets rather than electromagnets in order to eliminate the use of complex electrical control apparatus. The use of permanent magnets, however, has the disadvantage that the articles must be positively removed from the carriers instead of merely opening an electrical energizing circuit and allowing the articles to fall from the carriers, as in the case where electromagnets are used. Therefore, it becomes necessary to provide a device for positively removing articles from a carrier which is magnetized by means of permanent magnets.

It is an object of this invention to provide a new and improved magnetic article handling apparatus.

It is another object of this invention to provide a magnetic unloading device which cooperates with a magnetic article carrier to remove an article from the carrier.

It is another object of this invention to provide a magnetic carrier for moving articles through a plurality of fabricating stations to a magnetic unloading device having a magnetic force greater than the magnetic force of the carrier for removing articles from the carrier.

Another object of the invention is to provide a magnetic carrier for moving articles into a magnetic unloading device which is actuated by the movement of the carrier to remove the articles from the carrier.

Another object of the invention is to provide a magnetic carrier for moving paramagnetic articles to an unloading station whereat an unloading device having a magnetic force greater than that of the carrier and a stripper plate are moved into juxtaposition with the carrier to transfer the articles from the carrier to the unloading device after which the unloading device is moved away from the carrier and the stripper plate functions to remove the articles from the unloading device.

In furtherance of the preceding object, it is a further object of this invention to provide a stripper plate that is pivoted such that the plate is separated from the unloading means at an incline to remove the articles one at a time from the device whereby the articles move down the inclined surface formed by the plate.

With these and other objects in view, the present invention contemplates a magnetic carrier or rack for moving paramagnetic articles along a predetermined path through article fabricating stations and an unloading station. Movably mounted at the unloading station is an unloading device having a plurality of magnets extending therefrom and through apertures formed in a stripper plate. Upon movement of a rack into the unloading station, a means is actuated for moving the unloading device and stripper plate into juxtaposition with the rack. The magnets extending from the unloading device have a combined magnetic force greater than the magnetic force of the rack whereby the articles are transferred from the rack to the magnets. After a predetermined time delay, the unloading device is moved away from the rack and separated from the stripper plate thereby stripping the articles from the magnets and allowing the articles to fall into a container. The stripper plate may also take the form of a pivoted thin metallic sheet or a screen grid through which the articles are attracted by the magnets and which forms an inclined chute for removing the articles from the magnets one at a time and delivering them to the container or to a conveyor.

Other objects, advantages and novel aspects of the invention will become apparent upon consideration of the following detailed description in conjunction with the accompanying drawings wherein:

FIG. 1 is a fragmentary front elevational view of an apparatus for moving magnetic article carrying racks along a path through article fabricating stations and into an unloading station in accordance with the principles of the present invention;

FIG. 2 is a side view, partially cut away, disclosing the details of a magnetic unloading device before movement towards the article carrying magnetic rack;

FIG. 3 is a side view of the unloading device disclosed in FIG. 2 after the movement towards the magnetic rack;

FIG. 4 is an enlarged fragmentary view disclosing a portion of the unloading device and a stripper plate after the movement thereof towards the magnetic rack;

FIG. 5 is a sectional view taken along line 5—5 of FIG. 4;

FIG. 6 is a fragmentary view of the component shown in FIG. 5 after the initial movement of the unloading device and stripper plate away from the magnetic rack;

FIG. 7 discloses an alternative embodiment of the invention wherein a stripper plate is pivotally mounted to cooperate with the unloading device;

FIG. 8 is an enlarged fragmentary view of a portion of the unloading device and stripper plate of FIG. 7 showing the stripping of articles from the unloading device;

FIG. 9 is a diagram of a circuit for operating the unloading device shown in the other figures; and FIG. 10 is a circuit diagram of an unloading device utilizing electromagnets.

Attention is now directed to FIG. 1 wherein is shown a conveyor system, generally designated by the numeral 10, for moving article carrying magnetic racks 11 along a predetermined path and through a series of stations which may include a plurality of article cleaning, plating and rinsing tanks 12 and an article unloading station 13. The conveyor system may comprise a support plate 14 having brackets 16 mounted thereon for supporting a movable chain 17. The chain 17 is provided with L-shaped members 18 which push the magnetic racks 11 along a stationary guide rod 19 positioned above the tank 12.

The support plate 14 and chain 17 are movable (by means not shown) up and down a shaft 21 from the solid line position to the dotted line position shown in FIG. 1. A section 22 of the rod 19 is mounted on the support plate 14 by means of brackets 23 for movement with the plate 14. The rod section 22 extends from a position over the end portion of the tank 12 to a position over the unloading station 13 whereafter another portion of the stationary guide rod 19 is provided.

When the plate 14 and chain 17 are in the solid line position shown in FIG. 1, the chain is moved (by means not shown) to push the magnetic racks 11 along the rod 19 and through the solution within the tank 12. When the chain 17 moves the last rack 11 within the tank 12 to the dotted line position 24 and the rack is thus positioned on the section 22 of the rod 19, the plate 14, chain 17 and rod section 22 are moved upwardly to the dotted line position such that the lower extremity of the rack is positioned above the walls of the tank 12 as shown by the dotted line position 26 of the rack 11. The chain 17 is again moved to position the rack 11 directly over the unloading station 13 whereafter the plate 14, chain 17 and rod section 22 are again lowered, thereby placing the rack 11 within the unloading station.

After articles are removed from the rack 11 positioned within the unloading station, the chain 17 again moves the rack 11 onto the continuation of stationary rod 19. Simultaneously with such movement, a subsequent rack 11 is moved within the plating tank 12 to the dotted line position 24 and onto the rod section 22 whereafter the sequence of operation is repeated. It is to be understood that the above apparatus for moving magnetic racks is merely illustrative of one type of apparatus that may be used and that many other types of carriers or conveyors may be utilized.

FIGS. 2 and 3 disclose the details of an unloading device, generally designated by the numeral 27, which is positioned within the unloading station 13. The unloading device 27 comprises a pair of bushings 28 mounted on a pair of upright supports 29 and 31 which are in turn mounted on a base plate 32. The bushings 28 movably support a pair of rods 33 having one extremity thereof fixed to a pusher bar 34 and having the other extremity thereof fixed to a mounting board or plate 36. The bar 34 is secured to a piston rod 37 movable within an air cylinder 40.

The mounting plate 36 is provided with a plurality of magnets 38, which may be permanent magnets, having one extremity thereof embedded within the plate 36 and the other extremity thereof extending towards the path of movement of the magnetic racks 11. A pair of pins 39 extend from the mounting plate 36 for slidably supporting a stripper plate 41 which is urged towards the mounting plate 36 by means of tension springs 42. The stripper plate 41 is provided with a plurality of apertures 43 formed therein which are in alignment with the magnets 38. The stripper plate 41 is held in spaced relationship to the mounting plate 36 by extensions 44 projecting from the upright support 31 when the mounting plate 36 is retracted by operation of the air cylinder 40 to the position shown in FIG. 2.

Upon the piston rod 37 moving the mounting plate 36 and magnets 38 towards a rack positioned in the unloading station 13, the mounting plate 36 moves towards the stripper plate 41 until the magnets 38 extend through the apertures 43 formed in the plate 41. As the plate 36 continues its movement towards the rack 11, the stripper plate is engaged by the plate 36 and is carried thereby towards the rack. As disclosed in FIGS. 4 through 6, the magnets 38 are of a sufficient length to extend through and project beyond the stripper plate 41 whereby the magnets 38 engage a group of paramagnetic articles 46 held by the rack 11.

The rack 11 may consist of a pair of paramagnetic plates 47 (see FIG. 5) held in spaced relationship by means of magnets 48. The combined magnetic force of the magnets 38 extending from the mounting plate 36 is made to be greater than the magnetic force of the rack 11 thereby removing the articles 46 from the rack upon movement of the mounting plate 36 away from the rack as disclosed in FIG. 6. A brace 49 mounted on the base plate 32 holds and prevents the rack 11 from swinging outwardly upon the movement of the mounting plate 36 and the magnets 38 away from the rack.

Upon the return movement of the mounting plate 36 to the retracted position away from the rack 11, the mounting plate and the stripper plate 41 move towards the left as viewed in FIGS. 2 and 3 until the extensions 44 engage and hold the stripper plate. As the mounting plate and magnets continue to move, the stripper plate 41 and mounting plate 36 are separated and the magnets 38 are withdrawn through the apertures 43 in the stripper plate 41. The movement of the magnets 38 out of the apertures 43 causes the articles 46 to be removed from the magnets 38 because the articles are of a sufficient size to prevent the movement thereof through the apertures 43. A pan 51 is positioned beneath the extensions 44 of the upright support 31 to catch the articles 43 as they are removed from the magnets 38.

In operation of the above-described apparatus, a magnetic rack 11 is lowered to the unloading station 13 by the conveyor system 10 as described in conjunction with FIG. 1 whereby contacts of a switch 52 mounted on the shaft 21 are closed by the bracket 23 (FIG. 3). At this point, the mounting plate 36 and magnets 38 are in the retracted position as disclosed in FIG. 2. Upon closure of the contacts of the switch 52 (FIG. 9), a circuit is energized from a source of electrical power connected to terminals 53 to operate a solenoid 54 which operates an air valve (not shown) to force air into an inlet 55 on the air cylinder 40 to move the piston rod 37, pusher bar 34, rods 33, mounting plate 36 and magnets 38 towards the rack 11. Upon the closure of contacts of the switch 52, current is also passed through the windings of a time delay relay 56. Relay 56 is of a slow-to-operate type which introduces a time delay between the energizing of its windings and the closing of its contacts 57. The mounting plate 36 and magnets 38 continue to move towards the rack 11 carrying the stripper plate 41 therewith, until the piston rod 37 reaches the end of its stroke whereupon the magnets 38 are moved into engagement with the articles 46 on the rack 11 as disclosed in FIG. 3. After a predetermined time delay, the relay 56 pulls up the contact 57 into engagement with contact 58 and contacts 58 and 59 are opened. The closing of contacts 57 and 58 energizes a solenoid 61 and at the same time retains the relay 56 in an operated condition. The opening of contacts 58 and 59 breaks the energizing circuit for the solenoid 54, thereby preventing air from entering the inlet 55. The energization of solenoid 61 operates an air valve (not shown) to admit air into an inlet 62 on the air cylinder 40 which moves the piston rod 37 and therefore the mounting plate 36 and magnets 38 to the retracted position away from the rack 11 with the articles 46 attracted to the magnets 38. As the mounting board, magnets and stripper plate 41 move to the retracted position, the movement of the stripper plate 41 is halted by the extensions 44, separating the plate 41 from the mounting plate 36 and stripping the articles 46 from the magnets 38.

An additional embodiment of the unloading device is shown in FIGS. 7 and 8 wherein like numerals designate like elements existing in the embodiment described with respect to FIGS. 1 to 6. In this embodiment, a stripper plate 63 is pivotally mounted to the base plate 32. The upper extension 44 of the upright support 31 is provided with a U-shaped portion 64 to confine the movement of the stripper plate 63 between the full line and dotted line positions disclosed in FIG. 7. In this embodiment, the mounting plate 36 and magnets 38 move towards the stripper plate 63 and enter into apertures therein, as described in relation to FIGS. 2 and 3. However, upon the movement of the magnets 38 to the retracted position, the articles 46 held by the magnets engage stripper plate 63 and pivot the plate to the full line position as shown in FIG. 7. This type of stripper plate has the advantage of removing the articles from the magnets 38 one at a time as shown in FIG. 8, and allowing the articles to fall down an inclined surface formed by the stripper plate 63 into a pan 51, or onto a belt of a conveyor if desired.

Another embodiment of the invention may be formed by substituting a thin plate or screen grid for the stripper plate 41 or 63. The plate or grid would be interposed between the articles 46 and the magnets 38 when the unloading device 27 is in a forward position engaging the articles on the rack 11. As in the discussion in connection with FIG. 7, the plate or grid would be pivoted upon movement of the mounting plate 36 and magnets 38 by the attraction of the articles to the magnets. The plate or grid would then remove the articles one at a time from the magnets as discussed in connection with FIG. 7 and would act as an inclined chute to guide the articles within the pan 51 or to a conveyor belt positioned at the bottom of a plate or grid.

Other embodiments of the unloading device 27 may be obtained with the use of electromagnets instead of permanent type magnets 38. With the use of electromagnets, the stripper plate is eliminated altogther and the mounting plate 36 is either movable, as described in relation to FIGS. 2 and 3, or is fixedly mounted in juxtaposition to the path of movement of the racks 11, as in the position shown in FIG. 3. In the case of either a movable or stationary mounting device 27 using electromagnets 65, the magnets are energized as disclosed in FIG. 10. A source of current (not shown) connected to the terminals 53 energizes electromagnets 65 through the switch 52, closed by the movement of the plate 14 on the shaft 21, and through normally closed contact 68. Then upon movement of the racks out of the unloading station 13, a rack 11 closes the contacts of a switch 66 (FIG. 1) mounted on the bracket 23, to operate a relay 67. The operation of relay 67 opens normally closed contacts 68 to deenergize the circuit for electromagnets 65 and closes a locking circuit through contacts 69 to retain the relay operated until the opening of the switch 52.

In this embodiment, the magnetic force of the electromagnets 65 is greater than the force exerted by the magnetic racks. When the electromagnets 65 are energized, the paramagnetic articles 46 are removed from the juxtaposed rack 11. Upon movement of the rack from the unloading device, the electromagnets are deenergized and the articles drop into a suitable receptacle.

It is to be understood that the above-described arrangements are simple illustrative of the application of the principles of this invention. Numerous other arrangements may be readily devised by those skilled in the art which will embody the principles of the invention and fall within the spirit and scope thereof.

What is claimed is:

1. Magnetic article handling apparatus which comprises, a magnetic rack for carrying paramagnetic articles to an unloading station, a mounting member having a plurality of magnets extending therefrom with a combined magnetic force that is greater than the magnetic force of said rack, means for supporting said mounting member in the unloading station, a stripper member mounted at the unloading station between said mounting member and said rack, said mounting member being movable with respect to said stripper member and said stripper member having apertures formed therein through which said magnets may extend, means for moving said mounting member into juxtaposition with said rack whereby said magnets extend through the apertures in said stripper member and the articles are transferred from said rack to said magnets, and for moving said mounting member away from said rack, said stripper member removing the articles from said magnets as said mounting member moves away from said rack.

2. Magnetic article handling apparatus which comprises, a magnetic rack for carrying paramagnetic articles to an unloading station, a mounting member having a plurality of magnets extending therefrom with a combined magnetic force that is greater than the magnetic force of said rack, means for supporting said mounting member in the unloading station, a stripper member mounted at the unloading station between said mounting member and said rack, said mounting member being movable with respect to said stripper member and said stripper member having apertures formed therein through which said magnets may extend, means for moving said mounting member into juxtaposition with said rack whereby said magnets extend through the apertures in said stripper member and the articles are transferred from said rack to said magnets, and for moving said mounting member away from said rack, said stripper member and said mounting member being oriented with respect to one another so that the free ends of said magnets are withdrawn from the apertures in said stripper member in sequence as said mounting member moves away from said rack, whereby the articles are stripped from said mounting member and said magnets by said stripper member in sequence.

3. Magnetic article handling apparatus which comprises, a magnetic rack for carrying paramagnetic articles to an unloading station, a mounting plate having a plurality of magnets extending therefrom with a combined magnetic force that is greater than the magnetic force of said rack, means for supporting said mounting plate in the unloading station, a stripper plate mounted at the unloading station between said mounting plate and said rack for movement with respect to said mounting plate and said rack, said stripper plate having apertures formed therein through which said magnets may extend, means for moving said mounting plate and said stripper plate into juxtaposition with said rack whereby articles are transferred from said rack to said magnets on said mounting plate and for moving said mounting plate and said stripper plate away from said rack, and means for interrupting the movement of said stripper plate to separate said stripper plate and said mounting plate for removing the articles from said magnets.

4. A magnetic article handling apparatus comprising a magnetic rack for carrying paramagnetic articles thereon, means for positioning the rack at an unloading station, a mounting plate having a plurality of magnets extending therefrom with a combined magnetic force that is greater than the magnetic force of the rack, means for supporting said mounting plate in said unloading station, a stripper plate slidably mounted on the mounting plate and having apertures formed therein through which the magnets extend, means operated by the movement of the rack into the unloading station for moving the mounting plate and stripper plate into juxtaposition with the rack whereby articles are transferred from the rack to the magnets on the mounting plate, means for moving the mounting plate and stripper plate away from the rack after a predetermined time delay, and means for interrupting the movement of the stripper plate to separate the stripper plate and the mounting plate for removing the articles from the magnets.

5. An unloading device for removing paramagnetic articles from a magnetic rack which comprises, a pair of upright supports, a pair of bushings mounted in said supports, a pair of rods slidably positioned in said bushings, a mounting plate connected to one extremity of each rod and having pins extending therefrom, a stripper plate slidably mounted on the pins, means for urging the stripper plate into engagement with the mounting plate, said stripper plate having a plurality of apertures formed therein, a plurality of magnets having a combined magnetic force greater than the magnetic force of the rack, said magnets having one extremity embedded in the mounting plate and the other extremity extending through the apertures in the stripper plate, means connected to the rods for imparting a forward and reverse movement to the mounting plate and stripper plate towards and away from the rack, and means for engaging the stripper plate during the reverse movement thereof for separating the stripper plate from the mounting plate.

6. Magnetic article handling apparatus which comprises, a substantially vertically disposed magnetic rack for carrying paramagnetic articles to an unloading station, a substantially vertically disposed mounting plate mounted at the unloading station, magnetic means carried by said mounting plate for producing a magnetic force greater than the magnetic force of said rack, a stripper member mounted at the unloading station between said mounting plate and said rack for movement with respect to said mounting plate and said rack, means for moving said mounting plate and said stripper member horizontally into juxtaposition with said rack whereby articles are removed from said rack by said magnetic means and for moving said mounting plate and said stripper member away from said rack, and stop means for interrupting the movement of said stripper member to separate said stripper member and said mounting plate for removing the articles from said magnetic means.

7. A magnetic article handling apparatus which comprises, a magnetic rack for carrying paramagnetic articles thereon, means for positioning the rack at an unloading station, a mounting plate movably mounted at said unloading station and having a plurality of magnets extending therefrom for producing a combined magnetic force greater than the magnetic force of the rack, means operated by the movement of the rack into the unloading station for moving the mounting plate into juxtaposition with the rack whereby articles are transferred from the rack to the magnets, a stripper plate pivotally mounted at the unloading station and having apertures for accommodating the magnets extending from the mounting plate, said stripper plate positioned parallel to and in engagement with the mounting plate with the magnets extending through the apertures when the mounting plate is in juxtaposition with the rack, means for moving the mounting plate away from the rack after a predetermined time delay whereby the articles engage and pivot the stripper plate away from the rack, and means for interrupting movement of the stripper plate to remove the articles from the magnets.

8. A magnetic article handling apparatus which comprises, a magnetic rack for carrying paramagnetic articles along a predetermined path, means for intermittently moving the racks along said path, a mounting plate movably mounted at the end of said path, a plurality of magnets having one extremity thereof embedded within said mounting plate and having a combined magnetic force greater than the magnetic force of the rack, first switch means operated by the movement of the rack to the end of said predetermined path for moving the mounting plate into juxtaposition with the rack whereby articles are transferred from the rack to the magnets, a stripper plate pivotally mounted at the end of said path and having apertures therein for said magnets extending from the mounting plate, said stripper plate positioned to be parallel to and in engagement with the mounting plate with the magnets extending through the apertures in the stripper plate when the board is in juxtaposition with the rack, second switch means operated by the first switch means for moving the mounting plate away from the rack after a predetermined time delay whereby the articles engage and pivot the stripper plate away from the rack, and means for interrupting movement of the stripper plate to remove the articles from the magnets.

9. Magnetic article handling apparatus which comprises, a magnetic rack for carrying paramagnetic articles to an unloading station, a mounting plate movably mounted at the unloading station, magnetic means carried by said mounting plate for producing a magnetic force greater than the magnetic force of said rack, said mounting plate being movable into juxtaposition with said rack whereby the articles are removed from said rack by said magnetic means, a stripper plate pivotally mounted at one end at the unloading station between said mounting plate and said rack, said stripper plate being positioned parallel to said mounting plate when said mounting plate is in juxtaposition with said rack, and means for moving said mounting plate away from said rack with the articles engaging and pivoting the stripper plate away from said rack, whereby the articles are stripped from said mounting plate and magnetic means by said stripper plate in sequence, starting with those articles closest to the pivotal mounting of said stripper plate.

References Cited in the file of this patent

UNITED STATES PATENTS

| | | |
|---|---|---|
| 2,623,628 | Jones | Dec. 30, 1952 |
| 2,623,774 | Hubbard | Dec. 30, 1952 |
| 2,750,659 | Sassi | June 19, 1956 |
| 2,906,239 | Socke | Sept. 29, 1959 |